United States Patent
Suda et al.

(10) Patent No.: US 9,517,659 B2
(45) Date of Patent: Dec. 13, 2016

(54) HEAVY DUTY TIRE

(71) Applicant: BRIDGESTONE CORPORATION, Chuo-ku, Tokyo (JP)

(72) Inventors: Yasutaka Suda, Hachioji (JP); Yusuke Yoshikawa, Kodaira (JP); Shinya Yamamoto, Akishima (JP)

(73) Assignee: BRIDGESTONE CORPORATION, Tokyo (JP)

( * ) Notice: Subject to any disclaimer, the term of this patent is extended or adjusted under 35 U.S.C. 154(b) by 262 days.

(21) Appl. No.: 14/397,700

(22) PCT Filed: Apr. 18, 2013

(86) PCT No.: PCT/JP2013/002634
§ 371 (c)(1),
(2) Date: Oct. 29, 2014

(87) PCT Pub. No.: WO2013/168370
PCT Pub. Date: Nov. 14, 2013

(65) Prior Publication Data
US 2015/0083300 A1    Mar. 26, 2015

(30) Foreign Application Priority Data

May 11, 2012    (JP) ................... 2012-109864

(51) Int. Cl.
*B60C 9/00* (2006.01)
*B60C 9/18* (2006.01)
*B60C 9/20* (2006.01)

(52) U.S. Cl.
CPC ............... *B60C 9/1835* (2013.04); *B60C 9/18* (2013.01); *B60C 9/185* (2013.01); *B60C 9/20* (2013.01);
(Continued)

(58) Field of Classification Search
CPC ................... B60C 9/1835; B60C 2009/1828
(Continued)

(56) References Cited

U.S. PATENT DOCUMENTS

2002/0007890 A1    1/2002  Torresani
2004/0194862 A1*  10/2004  Fukutomi ............. B29C 73/163
                                                              152/204

(Continued)

FOREIGN PATENT DOCUMENTS

CN      102596592 A    7/2012
JP      2002-36815 A   2/2002

(Continued)

OTHER PUBLICATIONS

International Search Report of PCT/JP2013/002634, dated Jul. 16, 2013. [PCT/ISA/210].

*Primary Examiner* — Timothy Kennedy
(74) *Attorney, Agent, or Firm* — Sughrue Mion, PLLC

(57) ABSTRACT

The present invention provides a heavy duty tire, comprising: a carcass; a belt constituted of a circumferential belt including at least one circumferential belt layer and a slant belt including at least one slanted belt layer, each belt layer being made of cords coated with belt coating rubber; and a cushion rubber provided on the outer side in the tire width direction of the belt layers, characterized in that: the cushion rubber has a belt adjacent portion adjacent to the belt and a main body portion adjacent to the belt adjacent portion; and provided that E1', E2' and E3' represent storage modulus values of the belt adjacent portion of the cushion rubber, the main body portion of the cushion rubber, and the belt coating rubber, respectively, E1', E2' and E3' satisfy relationship $E2' < E1' \leq E3'$.

5 Claims, 4 Drawing Sheets

(52) U.S. Cl.
CPC .............. *B60C 2001/0075* (2013.04); *B60C 2009/1842* (2013.04); *B60C 2009/2064* (2013.04); *B60C 2200/06* (2013.04)

(58) Field of Classification Search
USPC ........................................ 152/532
See application file for complete search history.

(56) References Cited

U.S. PATENT DOCUMENTS

| | | | |
|---|---|---|---|
| 2008/0169053 A1* | 7/2008 | Nakamura | B60C 1/0016 152/209.5 |
| 2009/0071586 A1* | 3/2009 | Nakamura | B60C 1/0025 152/525 |
| 2012/0216935 A1 | 8/2012 | Nakata et al. | |

FOREIGN PATENT DOCUMENTS

| | | |
|---|---|---|
| JP | 200426111 A | 1/2004 |
| JP | 2005313837 A | 11/2005 |
| JP | 2010-137813 A | 6/2010 |
| JP | 2012-66628 A | 4/2012 |
| WO | 2011/036893 A1 | 3/2011 |
| WO | 2012/090825 A1 | 7/2012 |

\* cited by examiner

HEAVY DUTY TIRE

CROSS REFERENCE TO RELATED APPLICATIONS

This application is a National Stage of International Application No. PCT/JP2013/002634 filed Apr. 18, 2013, claiming priority based on Japanese Patent Application No. 2012-109864, filed May 11, 2012, the contents of all of which are incorporated herein by reference in their entirety.

TECHNICAL FIELD

The present invention relates to a heavy duty tire and, in particular, a heavy duty pneumatic tire exhibiting low rolling resistance and high durability in a compatible manner.

BACKGROUND ART

There has been generally used in a tire a cushion rubber member for correctly shaping an inner surface of the tire to an adequate configuration. Such a cushion rubber member, when it is used for a tire having a belt structure including a circumferential belt and a slant belt, normally employs rubber having relatively low contents of carbon, sulfur and cobalt to reduce rolling resistance of the tire. Cushion rubber therefore generally has relatively low storage modulus and relatively poor adhesion capabilities.

However, in a case of a heavy duty tire which is becoming increasingly flat, in particular, a heavy duty tire having aspect ratio of 70% or less, use of such cushion rubber as described above in a belt structure including a circumferential belt and a slant belt results in a situation in which rubber having relatively poor adhesion capabilities is directly in contact with a slanted belt layer of the slant belt, thereby causing a problem in that sulfur and cobalt contained in belt coating rubber of the slanted belt layer migrate into the cushion rubber to deteriorate adhesion capabilities between steel cords and the coating rubber. Further, in this case, there arises another problem in that the cushion rubber having low storage modulus, disposed close to a side of the circumferential belt, increases strain of the circumferential belt in the cord extending direction.

In view of this, there has been proposed in PTL 1 a method of avoiding the durability problems as described above by providing a cover rubber member having a rubber composition similar to that of the belt coating rubber at an end portion of the slanted belt layer to ensure clearance between the steel cords of slanted belt layer and the cushion rubber.

CITATION LIST

Patent Literature

PTL 1: JP2010-137813

SUMMARY OF THE INVENTION

Technical Problems

However, provision of another member between a slant belt and cushion rubber and/or between the cushion rubber and a circumferential belt causes a problem in that productivity of the tire is significantly hampered.

The present invention aims at solving the aforementioned problems and an object thereof is to provide a heavy duty tire exhibiting low rolling resistance and high durability in a compatible manner without sacrificing productivity when the tire has a structure in which cushion rubber is provided between belt layers.

Solution to the Problems

The inventors of the present invention, as a result of a keen study to solve the aforementioned problems, discovered that it is possible to suppress rolling resistance and ensure satisfactory durability of a tire in a compatible manner by using rubber having adequately set storage modulus and loss tangent in a portion of cushion rubber adjacent to a belt of the tire.

Primary structural features of the present invention to solve the aforementioned problems are as follows.

A heavy duty tire of the present invention, comprising: a carcass provided in a toroidal shape across a pair of bead portions; a belt provided on the outer side in the tire radial direction of a crown portion of the carcass and constituted of a plurality of belt layers each made of cords coated with belt coating rubber; a circumferential belt and a slant belt constituting the belt, the circumferential belt including at least one circumferential belt layer made of cords extending in the tire circumferential direction, the slant belt being provided on the outer side in the tire radial direction of the circumferential belt and including at least one slanted belt layer made of cords extending to be inclined with respect to the tire circumferential direction; and a cushion rubber provided between the carcass and a belt layer having the largest width in the tire width direction among the plurality of belt layers and in a region on the outer side in the tread width direction of the belt layers positioned on the inner side in the tire radial direction than the belt layer having the largest width, characterized in that: the cushion rubber has a belt adjacent portion and a main body portion, the belt adjacent portion being adjacent to end portions on the outer side in the tire width direction of the belt layers positioned on the inner side in the tire radial direction than the belt layer having the largest width, the main body portion being provided to be adjacent to the belt adjacent portion and extend on the inner side in the tire radial direction along the carcass; and provided that E1', E2' and E3' represent storage modulus values of the belt adjacent portion of the cushion rubber, the main body portion of the cushion rubber, and the belt coating rubber, respectively, E1', E2' and E3' satisfy following relationship.

$$E2' < E1' \leq E3'$$

In the present invention, storage modulus and loss tangent are each represented by values measured according to the standards of JIS K 6394 (testing methods of dynamic properties for vulcanized rubber and thermoplastic rubber) under the conditions of dynamic strain: 2% and the room temperature. The same principles are applied to any storage modulus values and loss tangent values in the present invention.

Further, in the present specification, dimensions such as width and distance of the pneumatic tire of the present invention represent dimensions such as width and distance in a cross section in the tire width direction measured in a state where the tire has been assembled with a prescribed rim and inflated at prescribed internal pressure with no load thereon. In this connection, a "prescribed rim" represents a rim prescribed by an industrial standard which is valid in an area where the tire is manufactured and used. Examples of the industrial standard include: JATMA (The Japan Automobile Tyre Manufacturers Association, Inc.) YEAR BOOK in Japan; ETRTO (European Tyre and Rim Technical Organisation) STANDARD MANUAL in Europe; TRA (THE TIRE and RIM ASSOCIATION INC.) YEAR BOOK in the United States; and the like. "Prescribed internal pressure" represents internal pressure corresponding to the maximum loading capacity of a tire of each prescribed size, found in a relevant industrial standard such as JATMA.

Advantageous Effect of the Invention

According to the present invention, it is possible to achieve low rolling resistance and high durability of a tire in a compatible manner by using rubber having adequately set storage modulus and loss tangent in a portion of cushion rubber adjacent to a belt of the tire.

DESCRIPTION OF THE EMBODIMENTS

Figure 1:
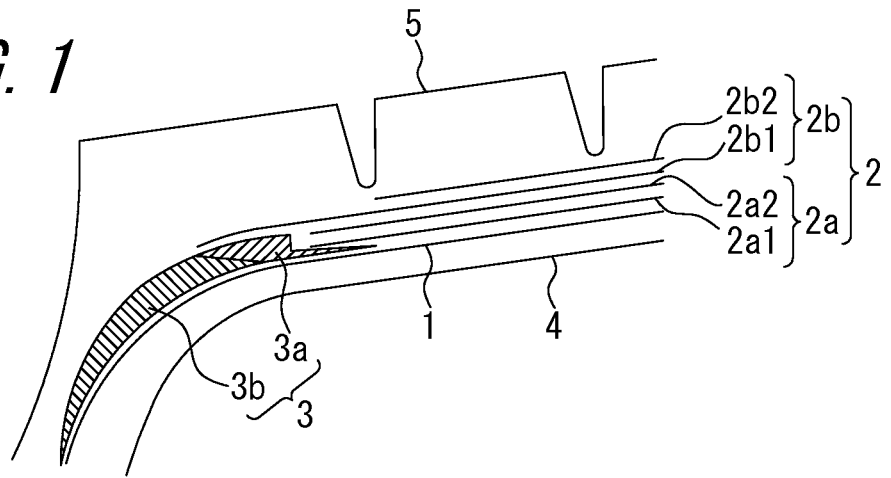
FIG. 1 is a schematic, partial cross sectional view of a heavy duty tire according to one embodiment of the present invention.

The present invention will be described in detail hereinafter with reference to the drawings. FIG. 1 is a partial cross sectional view of a heavy duty tire (which will be referred to simply as a "tire" hereinafter) according to one embodiment of the present invention.

Specifically, the tire has, as shown in FIG. 1, a carcass 1 constituted of at least one carcass ply made of cords coated with coating rubber and a belt 2 provided on the outer side in the tire radial direction of a crown portion of the carcass 1 and constituted of a plurality of belt layers (four belt layers in the example shown in FIG. 1) 2a1, 2a2, 2b1, 2b2 each made of cords coated with belt coating rubber. The tire shown in FIG. 1 further has at least one inner liner 4 provided on the tire inner surface side than the carcass 1 for retaining internal pressure of the pneumatic tire and a tread 5 provided on the outer side in the tire radial direction of the belt 2.

The belt 2 has: a circumferential belt 2a including at least one circumferential belt layer (two layers in the example shown in FIG. 1) 2a1, 2a2 made of wavy-formed cords extending in the tire circumferential direction; and a slant belt 2b including at least one slanted belt layer (two layers in the example shown in FIG. 1) 2b1, 2b2 made of cords linearly extending to be inclined with respect to the tire circumferential direction in the present embodiment.

The tire further has a cushion rubber 3 between the carcass 1 and a belt layer 2b1 having the largest width in the tire width direction among the plurality of belt layers 2a1, 2a2, 2b1, 2b2 and in a region on the outer side in the tread width direction of the belt layers 2a1, 2a2 positioned on the inner side in the tire radial direction than the belt layer 2b1 having the largest width.

The cushion rubber 3 of the example shown in FIG. 1 has a double-layer structure, i.e. includes: a portion 3a adjacent to end portions on the outer side in the tire width direction of the slanted belt layers 2b1 and the circumferential belt layers 2a1, 2a2 (which portion 3a will be referred to as a "belt adjacent portion" hereinafter); and a portion 3b adjacent to the belt adjacent portion 3a and extending on the inner side in the tire radial direction along the carcass 1 from an end face portion on the outer side in the tire width direction of the belt adjacent portion 3a (which portion 3b will be referred to as a "main body portion" hereafter). In short, the cushion rubber 3 is provided such that the cushion rubber 3 faces the belt 2 by way of the belt adjacent portion 3a thereof.

In the present embodiment shown in FIG. 1, the belt adjacent portion 3a is adjacent to the main body portion 3b at a line as a border therebetween extending from a vicinity of an end portion of the slanted belt layer 2b 1 having the largest width in the tire width direction toward the inner side both in the tread width direction and the tire radial direction. Further, the belt adjacent portion 3a has a configuration extending on the inner side in the tread width direction between the carcass 1 and the circumferential belt layer 2a1 positioned on the innermost side in the tire radial direction.

It is critically important in the present invention that, provided that E1', E2' and E3' represent storage modulus values of the belt adjacent portion 3a of the cushion rubber 3, the main body portion 3b of the cushion rubber 3, and the belt coating rubber, respectively, E1', E2' and E3' satisfy following relationship.

$$E2'<E1'\leq E3'$$

Figure 2:
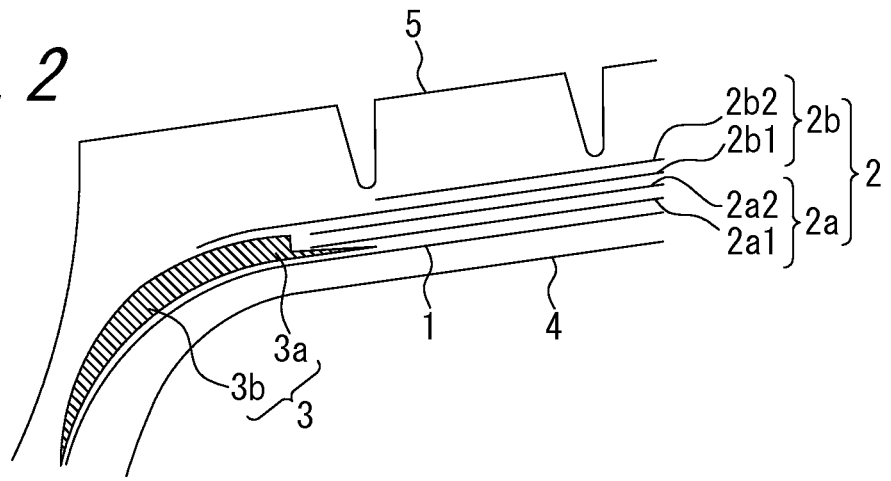
FIG. 2 is a schematic cross sectional view of a conventional heavy duty tire.

More specifically, in a case of cushion rubber 3 having a conventional single layer structure as shown in FIG. 2, the cushion rubber 3 having low storage modulus and low loss tangent, i.e. having low contents of sulfur and cobalt, is directly in contact with the slant belt 2b (In FIG. 2, a portion adjacent to the slant belt 2b of the conventional single-layer cushion rubber 3, positionally corresponding to the belt adjacent portion 3a of the tire shown in FIG. 1, is indicated by the same reference number "3a" as in FIG. 1 only for explanatory purposes, although the portion of the conventional cushion rubber 3 of FIG. 2 is not equivalent to the belt adjacent portion 3a of FIG. 1), whereby i) sulfur and cobalt contained in the belt coating rubber provided on the slant belt 2b migrate into the cushion rubber 3 and eventually deteriorate adhesion capabilities between the cords and the belt coating rubber to cause separation therebetween to occur at an early stage and ii) the single-layer cushion rubber 3 having low storage modulus increases strain of the circumferential belt 2a in the cord extending direction to possibly facilitate cord breakage at an end portion of the circumferential belt 2a. In contrast, in the case of the structure as shown in FIG. 1 of the present invention, migration of sulfur and cobalt from the belt coating rubber can be suppressed because the belt adjacent portion 3a having high storage modulus and high loss tangent, i.e. high contents of sulfur and cobalt, is in contact with the belt 2. Further, the belt adjacent portion 3a having high storage modulus can suppress strain of the circumferential belt 2a in the cord extending direction, as well, in this case. Accordingly, the cushion rubber 3 of the present invention as shown in FIG. 1 can safely avoid the aforementioned problems associated with the conventional single-layer cushion rubber.

Moreover, the cushion rubber 3 of the present invention as shown in FIG. 1 can also cause, due to the main body portion 3b thereof, an effect of correctly shaping an inner surface of the tire to an adequate configuration.

The circumferential belt layer of the present invention may be made of linear cords, although the circumferential belt layers 2a1, 2a2 of the present embodiment are each made of wavy-formed cords.

It is preferable in the present invention in terms of obtaining the good effects thereof described above that the tire has a belt structure as shown in FIG. 1, in which the circumferential belt 2a and the slant belt 2b are provided in this order on the outer side in the tire radial direction of a crown portion of the carcass 1 and one of the slanted belt layers of the slant belt 2b has the largest width in the tire width direction among the belt layers. The belt layer having the largest width in the tire width direction is the slanted belt layer 2b1, while the slanted belt layer 2b2 has a shorter width in the tire width direction than the circumferential belt 2a in the example shown in FIG. 1. However, the slanted belt layer 2b2 may be as wide as the slanted belt layer 2b1 so that the slanted belt layer 2b2 has a larger width in the tire width direction than the circumferential belt 2a. Alternatively, the slanted belt layer 2b2 may have the largest width among the belt layers.

Figure 3:
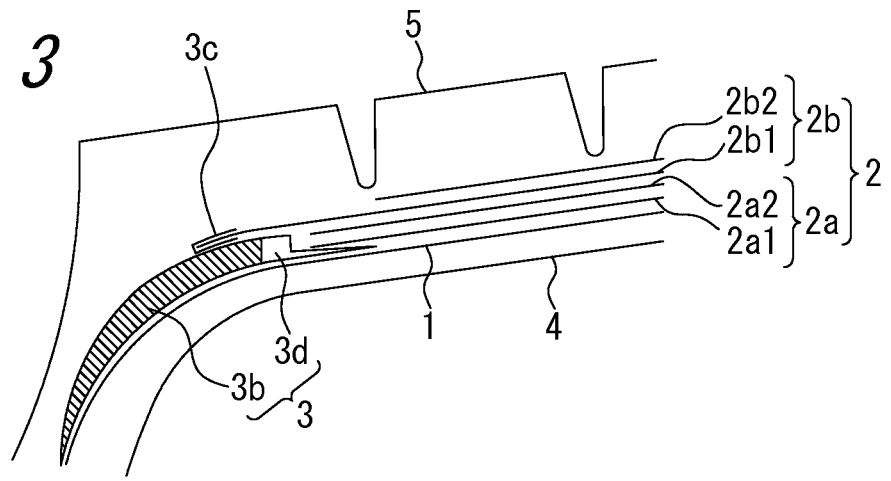
FIG. 3 is a schematic cross sectional view of another conventional heavy duty tire.
Figure 4:
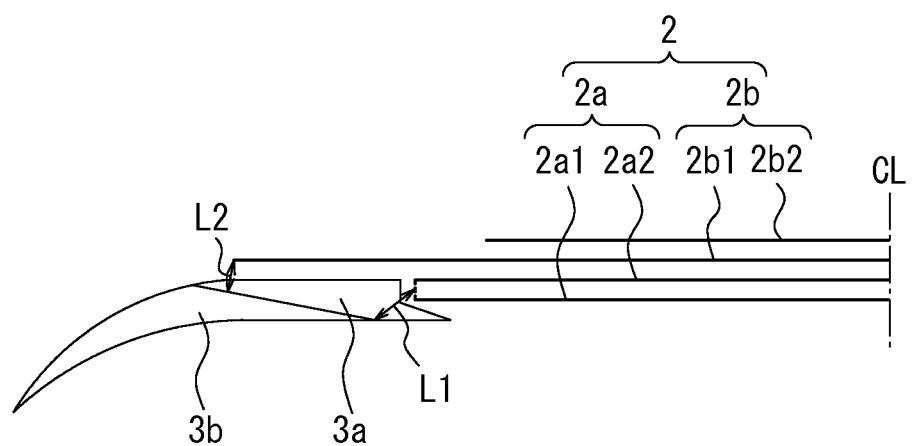
FIG. 4 is a view showing positional relationships between circumferential belt layers, slanted belt layers, and cushion rubber of the heavy duty tire of the present invention.

Further, in another conventional case where a cover rubber member 3c for covering an end portion of the slanted belt layer 2b1 and a side rubber member 3d adjacent to the circumferential belt 2a are provided as shown in FIG. 3, productivity is hampered owing to increases in number of the necessitated members and attaching processes in production. However, such a problem is also solved in the present invention because it simply requires use of rubber having adequately set storage modulus and loss tangent in the belt adjacent portion 3a of the cushion belt 3.

Yet further, it is preferable in terms of correctly shaping an inner surface of the tire to an adequate configuration that the main body portion 3b of the cushion rubber 3 has loss tangent tan $\delta 2$ in the range of $0.01<\tan \delta 2<0.2$ and storage modulus E2' (MPa) in the range of $1<E2'<15$.

It is possible to suppress exfoliation of the cushion rubber from other rubber in the vicinity thereof due to adhesion failure between the two rubbers by setting tan $\delta 2$ to exceed 0.01 and also suppress energy loss to effectively reduce rolling resistance of the tire by setting tan $\delta 2$ to be less than 0.2.

Further, it is possible to suppress strain and thus self-destructive fracture of the cushion rubber itself by setting E2' to exceed 1 (MPa). Yet further, it is possible to ensure: satisfactory fracture resistance when large force is applied to the cushion rubber to suppress self-destructive fracture of the cushion rubber; and good workability in the molding process to make it easy to mold the rubber to a desired belt-like shape, by setting E2' to be less than 15 (MPa).

The belt adjacent portion 3a is preferably disposed such that, provided that the shortest distance between the outermost end in the tire width direction of the slanted belt layer 2b1 having the largest width and the main body portion 3b of the cushion rubber is L2 and the shortest distance between the outermost end in the tire width direction of the circumferential belt 2a and the main body portion 3b of the cushion rubber is L1, $L2 \geq 1$ mm and $L1 \geq 2.5$ mm.

The shortest distance $L2 \geq 1$ mm between the outermost end in the tire width direction of the slanted belt layer 2b1 having the largest width and the main body portion 3b of the cushion rubber is effective in terms of reliably suppressing migration of sulfur and cobalt. The shortest distance $L1 \geq 2.5$ mm between the outermost end in the tire width direction of the circumferential belt 2a and the main body portion 3b of the cushion rubber is effective in terms of suppressing strain of a circumferential belt end to enhance resistance to circumferential belt breakage.

In a case where the circumferential belt 2a includes a plurality of circumferential belt layers as in the example shown in FIG. 1, it is preferable to set the shortest distance L1 to be at least 2.5 mm for the circumferential belt layer having the smallest value of the shortest distance L1 among the plurality of circumferential belt layers.

Further, widths in the tire width direction of the slanted belt layers 2b1, 2b2 are preferably 30% to 120% and more preferably 105% to 110% of widths in the tire width direction of the circumferential belt layers 2a1, 2a2.

It is possible to effectively protect the circumferential belt layers 2a1, 2a2 retaining the internal pressure when the tire steps over a projection like a stone by setting the widths in the tire width direction of the slanted belt layers 2b1, 2b2 to be at least 30% of the widths in the tire width direction of the circumferential belt layers 2a1, 2a2. It is possible to suppress occurrence of troubles starting at an edge of the slanted belt layer having the largest width by setting the widths in the tire width direction of the slanted belt layers 2b1, 2b2 to be 120% or less of the widths in the tire width direction of the circumferential belt layers 2a1, 2a2.

In particular, it is possible to achieve satisfactory belt durability when the tire diameter increases, in a well balanced manner, by setting the widths in the tire width direction of the slanted belt layers 2b1, 2b2 to be 105% to 110% of the widths in the tire width direction of the circumferential belt layers 2a1, 2a2.

Tire aspect ratio is preferably 70% or less in the present invention.

Figure 5:
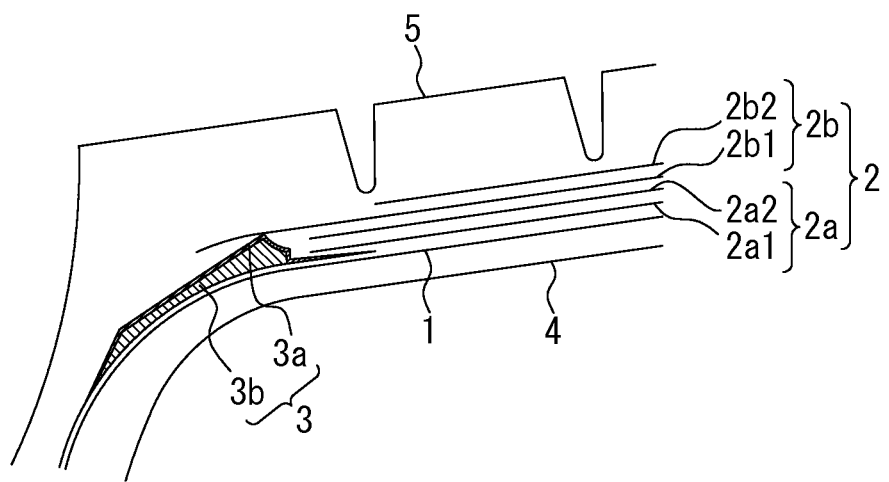
FIG. 5 is a schematic, partial cross sectional view of a heavy duty tire according to another embodiment of the present invention.

FIG. 5 is a partial cross sectional view of a tire according to another embodiment of the present invention.

The tire shown in FIG. 5 is different from the tire shown in FIG. 1 only in the configuration of the cushion rubber 3.

The tire shown in FIG. 5 is different from the tire shown in FIG. 1 in that the belt adjacent portion 3a of the former is provided so as to cover a peripheral portion on the outer side in the tire radial direction of the main body portion 3b of the cushion rubber 3. The belt adjacent portion 3a is provided such that the belt adjacent portion 3a and the carcass 1 surround the main body portion 3b of the cushion rubber 3 in the example shown in FIG. 5.

According to the tire as shown in FIG. 5, deflection of the cushion rubber 3 in the tire manufacturing process can be suppressed. Specifically, the cushion rubber 3 having the double-layer structure in which the belt adjacent portion 3a and the main body portion 3b having different elastic moduli are juxtaposed to each other may be somewhat deflected in the tire manufacturing process because of difference in shrinking percentage between the two portions 3a, 3b in the present invention. However, the belt adjacent portion 3a suppresses deformation of the main body 3b and thus undesirable deflection of the cushion rubber 3 in the structure in which the belt adjacent portion 3a covers a peripheral portion on the outer side in the tire radial direction of the main body portion 3b as shown in FIG. 5.

EXAMPLES

Test tires were prepared by assembling tires each having size:

TBR445/50R22.5 with rims each having rim width: 14 inches and then inflating the tires thus assembled with the rims at the prescribed internal pressure. Rolling resistance, QC durability, belt adhesion capabilities, and resistance to circumferential belt breakage were tested, respectively, by using the test tires in order to confirm difference in tire performance between the conventional tires and the tires of the present invention. The respective testing methods are as follows.

<Rolling Resistance of Tire>

Rolling resistance of a test tire was determined by: rotating a drum in a state where the test tire was in contact with the drum; increasing the rotational speed of the drum to a predetermined rotational speed and then disconnecting transmission of rotational driving force to the drum; and calculating rolling resistance based on how the rotational speed of the drum was decreased by rolling of the tire.

<QC Durability>

QC durability of a test tire was determined by a what is called "QC drum test", i.e. a test using a drum tester including: running the test tire on the drum tester under the conditions of prescribed internal pressure, load and speed; and evaluating heating generating properties of the tire by the time counted prior to occurrence of a trouble in the tire.

<Belt Adhesion Capabilities>

Belt adhesion capabilities of a test tire were determined by subjecting the test tire to a test using a drum tester including running the test tire on the drum tester under the conditions of internal pressure: 900 kPa, load: 6000 kg, side force: 3045 kgf, speed: 60 km/hour, and running time: 12 hours.

<Resistance to Circumferential Belt Breakage>

Resistance to circumferential belt breakage of a test tire was determined by subjecting the test tire to a test using a drum tester including running the test tire on the drum tester under the conditions of internal pressure: 900 kPa, load: 6380 kg, speed: 60 km/hour, and running distance: 50,000 km.

The relevant characteristics of the test tires of Conventional Examples 1 to 4 and Examples 1 to 9 thus prepared, as well as the test results associated therewith, are shown in Table 1. Belt cords used in the test tires were (wavy-formed) steel cords. Respective tire performances are expressed by index values relative to the result of Conventional Example 1 being "100" in Table 1 (the larger index value represents the better performance).

TABLE 1

Figure 6A:
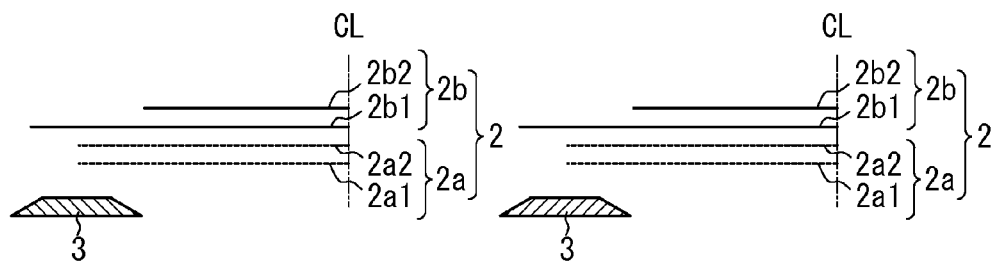
FIGS. 6A to 6E are schematic, partial cross sectional views of Example tires and Comparative Example tires.
Figure 6B:
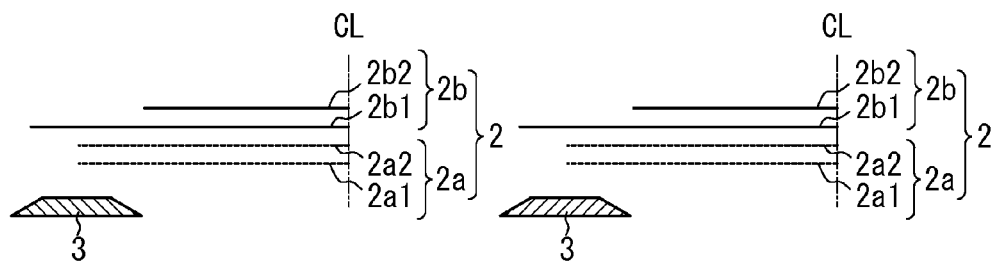
Figure 6C:
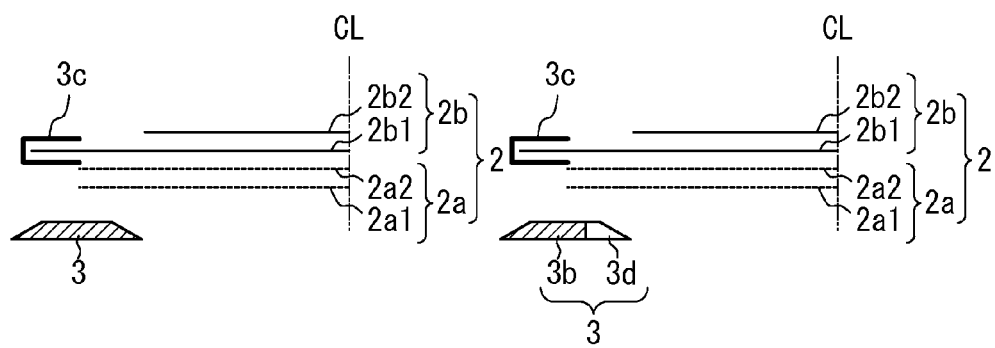
Figure 6D:
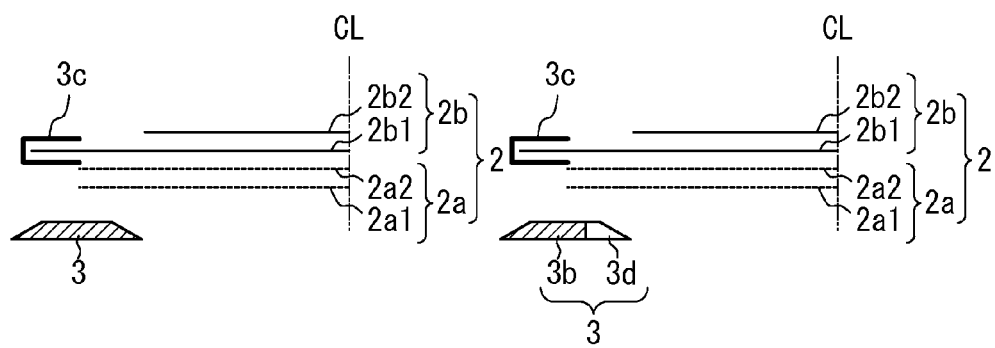
Figure 6E:
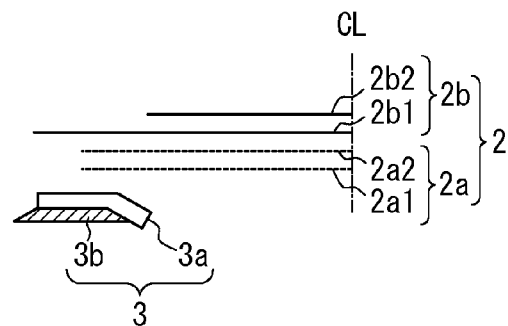

| | | | Conventional Example 1 | Conventional Example 2 | Conventional Example 3 | Conventional Example 4 | Example 1 | Example 2 | Example 3 |
|---|---|---|---|---|---|---|---|---|---|
| | Drawing | | FIG. 6A | FIG. 6B | FIG. 6C | FIG. 6D | FIG. 6E | FIG. 6E | FIG. 6E |
| | Cover rubber for slanted belt layer end | | None | None | Provided | Provided | None | None | None |
| | Belt coating rubber | Storage modulus E3' | 18 | 18 | 18 | 18 | 18 | 18 | 18 |
| Cushion rubber | Belt layer adjacent portion | Loss tangent | 0.26 | 0.06 | 0.06 | 0.26 | 0.26 | 0.16 | 0.16 |
| | | Storage modulus E1' | 18 | 4 | 4 | 18 | 18 | 11 | 11 |
| Cushion rubber | Main body portion | Loss tangent | 0.26 | 0.06 | 0.06 | 0.06 | 0.06 | 0.06 | 0.02 |
| | | Storage modulus E2' | 18 | 4 | 4 | 4 | 4 | 4 | 2 |
| | Productivity | | ○ | ○ | X | X | ○ | ○ | ○ |
| Performances | Rolling resistance | | 100 | 105 | 104 | 103 | 104 | 104 | 106 |
| | QC durability | | 100 | 110 | 108 | 107 | 108 | 109 | 110 |
| | Adhesion capabilities of slanted belt layer end | | 100 | 90 | 100 | 100 | 100 | 100 | 100 |
| | Resistance to circumferential belt layer breakage | | 100 | 92 | 92 | 100 | 100 | 100 | 100 |
| | Shortest distance L1 | | — | — | — | — | 2.5 mm | 2.5 mm | 2.5 mm |
| | Shortest distance L2 | | — | — | — | — | 1.0 mm | 1.0 mm | 1.0 mm |

| | | | Example 4 | Example 5 | Example 6 | Example 7 | Example 8 | Example 9 |
|---|---|---|---|---|---|---|---|---|
| | Drawing | | FIG. 6E | FIG. 6E | FIG. 6E | FIG. 6E | FIG. 6E | FIG. 6E |
| | Cover rubber for slanted belt layer end | | None | None | None | None | None | None |
| | Belt coating rubber | Storage modulus E3' | 18 | 18 | 18 | 18 | 18 | 18 |
| Cushion rubber | Belt layer adjacent portion | Loss tangent | 0.26 | 0.26 | 0.26 | 0.26 | 0.16 | 0.16 |
| | | Storage modulus E1' | 18 | 18 | 18 | 18 | 11 | 11 |
| Cushion rubber | Main body portion | Loss tangent | 0.01 | 0.2 | 0.06 | 0.225 | 0.06 | 0.06 |
| | | Storage modulus E2' | 1 | 14 | 4 | 15 | 4 | 4 |
| | Productivity | | ○ | ○ | ○ | ○ | ○ | ○ |
| Performances | Rolling resistance | | 108 | 102 | 103 | 101 | 105 | 106 |
| | QC durability | | 100 | 102 | 107 | 101 | 110 | 110 |
| | Adhesion capabilities of slanted belt layer end | | 100 | 100 | 100 | 100 | 99 | 94 |
| | Resistance to circumferential belt layer breakage | | 100 | 100 | 100 | 100 | 97 | 97 |
| | Shortest distance L1 | | 2.5 mm | 2.5 mm | 2.5 mm | 2.5 mm | 1.0 mm | 1.0 mm |
| | Shortest distance L2 | | 1.0 mm | 1.0 mm | 1.0 mm | 1.0 mm | 1.0 mm | 0.1 mm |

It is understood from Table 1 that: Examples 1 to 9 exhibit better rolling resistance than Conventional Example 1 because the formers each use rubber having low loss tangent and low storage modulus in the main body portion of the cushion rubber in order to reduce rolling resistance; and Examples 1 to 9 exhibit QC durability, belt adhesion capabilities, and resistance to circumferential belt breakage equal to or better than those of Conventional Examples 1, 2 because the formers each adopt a double-layer structure for the cushion rubber thereof and use rubber having high loss tangent and high storage modulus in the belt adjacent portion of the cushion rubber.

Further, Examples 1 to 9, not using any cover rubber for covering a belt end, can avoid deterioration of productivity as occurred in Conventional Examples 3, 4.

INDUSTRIAL APPLICABILITY

According to the present invention, it is possible to provide a heavy duty tire exhibiting low rolling resistance and high durability in a compatible manner to make it available to the market.

REFERENCE SIGNS LIST

1 Carcass ply
2 Belt
2a Circumferential belt
2b Slant belt
3 Cushion rubber
3a Belt adjacent portion
3b Main body portion
3c Cover rubber
3d Side rubber
4 Inner liner
5 Tread

The invention claimed is:

1. A heavy duty tire, comprising:
a carcass provided in a toroidal shape across a pair of bead portions;
a belt provided on the outer side in the tire radial direction of a crown portion of the carcass and constituted of a plurality of belt layers each made of cords coated with belt coating rubber;
a circumferential belt and a slant belt constituting the belt, the circumferential belt including at least one circumferential belt layer made of cords extending in the tire circumferential direction, the slant belt being provided on the outer side in the tire radial direction of the circumferential belt and including at least one slanted belt layer made of cords extending to be inclined with respect to the tire circumferential direction; and
a cushion rubber provided between the carcass and a belt layer having the largest width in the tire width direction among the plurality of belt layers and in a region on the outer side in the tread width direction of the belt layers positioned on the inner side in the tire radial direction than the belt layer having the largest width, characterized in that:
the cushion rubber has a belt adjacent portion and a main body portion, the belt adjacent portion being adjacent to end portions on the outer side in the tire width direction of the belt layers positioned on the inner side in the tire radial direction than the belt layer having the largest width, the main body portion being provided to be adjacent to the belt adjacent portion and extend on the inner side in the tire radial direction along the carcass; and
provided that E1', E2' and E3' represent storage modulus values of the belt adjacent portion of the cushion rubber, the main body portion of the cushion rubber, and the belt coating rubber, respectively, E1', E2' and E3' satisfy following relationship, $$E2' < E1' \leq E3',$$

wherein the storage modulus values are measured according to the standards of JIS K 6394 (testing methods of dynamic properties for vulcanized rubber and thermoplastic rubber) under conditions of dynamic strain: 2% and the room temperature.

2. The heavy duty tire of claim 1, wherein the main body portion of the cushion rubber has loss tangent $\tan \delta 2$ in the range of $0.01 < \tan \delta 2 < 0.2$ and storage modulus E2' (MPa) in the range of $1 < E2' < 15$ and the loss tangent is measured according to the standards of JIS K 6394 under conditions of dynamic strain: 2% and the room temperature.

3. The heavy duty tire of claim 1, wherein the belt adjacent portion is provided such that the shortest distance between the outermost end in the tire width direction of the slanted belt layer having the largest width and the main body portion of the cushion rubber is equal to or larger than 1 mm and the shortest distance between the outermost end in the tire width direction of the circumferential belt and the main body portion of the cushion rubber is equal to or larger than 2.5 mm.

4. The heavy duty tire of claim 1, wherein widths in the tire width direction of the slanted belt layers are 30% to 120% of widths in the tire width direction of the circumferential belt layers.

5. The heavy duty tire of claim 1, wherein tire aspect ratio is 70% or less.

* * * * *